E. MERTENS.
PROCESS OF LIGHTING IN PHOTOGRAPHY.
APPLICATION FILED OCT. 18, 1904.
1,001,549.
Patented Aug. 22, 1911.
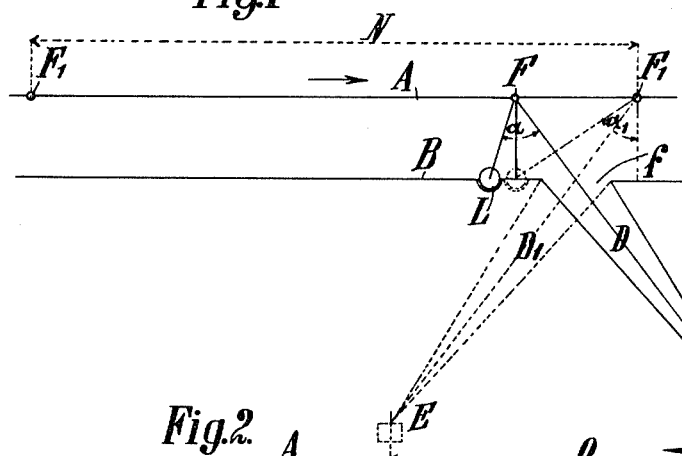
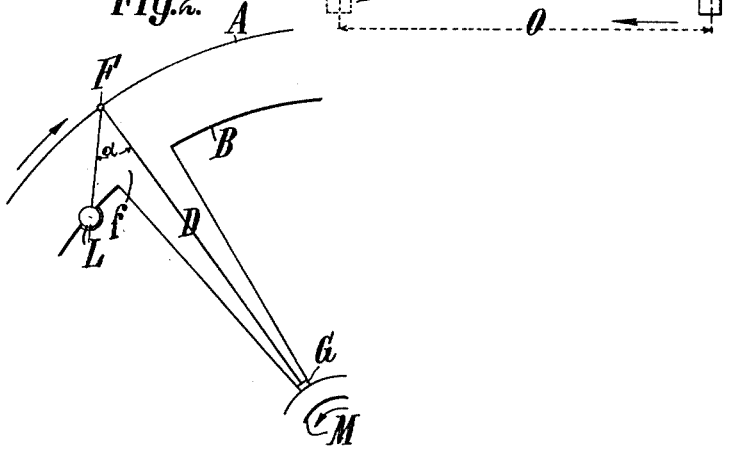
WITNESSES
INVENTOR
EDUARD MERTENS
by Howson and Howson
his attorneys

UNITED STATES PATENT OFFICE.

EDUARD MERTENS, OF GROSS-LICHTERFELDE OST, GERMANY.

PROCESS OF LIGHTING IN PHOTOGRAPHY.

1,001,549.  Specification of Letters Patent.  Patented Aug. 22, 1911.

Application filed October 18, 1904.  Serial No. 229,023.

*To all whom it may concern:*

Be it known that I, EDUARD MERTENS, a subject of the Emperor of Germany, residing at Jaegerstrasse 35/36, Gross-Lichterfelde Ost, near Berlin, Germany, have invented certain new and useful Improvements in Processes of Lighting in Photography; and I do hereby declare the following to be a full, clear, and exact description of the invention, such as will enable others skilled in the art to which it appertains to make and use the same.

Considerable difficulty has been experienced hitherto in uniformly lighting large surfaces such as drawings, wall coverings, reliefs, etc., for the purpose of photographing them. This uniform lighting has been impossible particularly in studios, the side toward the upper or side lights being always more fully lighted than the side toward the floor or the wall. Moreover it has been found impossible to insure uniform lighting by means of sources of light or reflectors arranged near to or behind the photographic camera.

According to the present invention uniform lighting is insured by the employment of a method which consists in a precisely determined movement of the object and the sensitive surface of the photographic film with relation to each other and to an interposed source of light carried by a slotted screen.

Figures 1 and 2 are diagrams illustrating arrangement involving a rectilineal and a curvilineal motion respectively.

This method is carried out as follows: A frame or screen B (Fig. 1) provided with a slot $f$ and carrying illuminating devices L, such as incandescent or arc lamps or the like is arranged between the object A to be photographed and the camera E carrying the objective and the sensitive surface. The frame B is stationary, while the object A and the camera E are shifted parallel to each other uniformly in opposite directions, as indicated by the arrows in Fig. 1. The object A is moved the distance N and the camera E is simultaneously moved the distance O. At the beginning of this movement the part F of the object is photographed, whereas at the end of this movement the part $F^1$, $F^1$ of the object is photographed. During the said movement the different parts of the object between the parts F and $F^1$ are photographed progressively. During the exposure an equal intensity of light falls on every part of the object that is to be photographed and just as much as is required for the different exposures. The frame B may have a rectangular form. The lamps are arranged on that side of the frame B which is toward the object, while the back of the frame is dark, so that only those parts of the object are photographed precisely over which the slot $f$ in the frame is situated through which the rays of light reach the objective, while the other part of the surface is prevented, by the dark back of the frame, from conveying rays of light to the objective.

Instead of moving the slotted frame only a single time across between the camera and the object for the exposure, it is possible to pass it across several times when the exposure is insufficient on the first passage.

By arranging the lamps on one side only of the frame, or by shutting off the light on one side, or by an arrangement of light screens, any desired effects of light and shade, for example in the case of objects in relief, can be obtained. Moreover by a movement of the source of light effected in accordance with due calculation, any desired graduations in the lighting can be insured.

If exposure be effected with one-sided illumination in the manner described, it is possible to photograph objects in connection with which, under the ordinary process, troublesome reflecting lights would have to be taken into account, and to avoid such troublesome effects, as the illuminating bodies can be placed so near to the object that reflecting rays cannot reach the objective.

If the illuminating bodies are only on one side of the slot, the frame described above, by way of example, can be successfully employed for photographing oil-paintings and the like.

If the light is to act with uniform intensity on the sensitive film the illuminating bodies arranged on the frame or screen introduced between the objective and object and provided with a slot, must be given a lateral movement, this being especially necessary in one-sided illumination, as in Fig. 1 since the angle $x$ or $x^1$ at which the rays D or $D^1$ travel from the source of light L to the points F or $F^1$ of the object A and to the camera E, varies as the position of this object and this camera is changed.

Instead of the movement of the object and film accelerating or retarding, the intensity of the light can be uniformly increased or diminished, this being effected by means of a device on the illuminating bodies as well as, for example, by varying the distance of the illuminating bodies, and by varying the width of the slot, widening or narrowing the width of the objective, and again by introducing a more or less transparent medium, as also by making the original larger or smaller or by covering the objective.

In order that alterations in the movement, different sources of mistake, and difficulties in construction may be avoided, in the case of objects which can be arranged in the form of a curve, the above described process may be employed with the object A and the screen B with the slot $f$ arranged concentrically around a sensitive cylinder or cylindrically bent film M, as shown in Fig. 2. In this case the movement is effected so that the object and the sensitive film rotate in opposite directions as indicated by the arrows in Fig. 2, while the screen B and the objective G remain stationary. In this way light will act uniformly on the plate whether the lighting be arranged on one side or on both sides as the angle $x$ at which the light passes from the lighting body L to the point F and thence to the objective G is always of the same size. In order to prevent blurring of the image on the negative, the slot $f$ must be narrower than is necessary in the rectilinear arrangement of Fig. 1 in which the proportional movement of the object and camera may be controlled from a point conforming approximately to the focus of the lens. In connection with this circular movement of the object and the sensitive film described above it may be pointed out that the film may be arranged in the space occupied by the object A in Fig. 2, while the frame with the objective is arranged around the object occupying the position M. In this way it is possible to uniformly photograph a statue for example, although as a distorted image it is true.

In taking photographs of raised and depressed surfaces, for example, reliefs, woven material, and the like, in order to obtain a plastic effect it is necessary that the objective be situated in a side light. Hitherto it has been impossible to avoid the lighted side being projected by the objective on one side of the plate and the shaded side on the other, so that in photographing fabrics for example, the one side appears brighter and the other darker. In connection therewith it is of course assumed that the reliefs, etc., are situated parallel to the sensitive plate.

The methods forming the basis of the present application enable photographs to be taken in which uniform effect of shade is always seen, the vertical slot and the objective being left stationary, side day-light or side illuminating bodies being employed, while during the exposure the object and the plate move symmetrically in opposite directions, so that the rays falling onto the plate always reach the plate approximately vertical thereto and to the object, or always at approximately the same angle.

When mention of sources of light or illuminating bodies is made in this application it is not intended to imply thereby only self-luminous devices: but indirect sources of light may also be employed for the illumination, such as prisms or mirrors, which receive the light from a source of light situated between the object and the objective.

I claim as my invention—

1. The method of illuminating an object for exposure to a member bearing a light sensitive surface, which consists in moving, during exposure, the object and light sensitive surface with relation to an interposed slotted screen carrying a source of light on the side adjacent the object, so as to present successive illuminated portions of the object to successive portions of the light sensitive surface, said member with light sensitive surface and said object having their opposed surfaces maintained at substantially the same distance from each other during the exposure, substantially as described.

2. The method of illuminating an object for exposure to a member having a light sensitive surface, which consists in moving, during exposure, the object and light sensitive surface with relation to an interposed slotted screen carrying a source of light on the side adjacent the object, and in opposite directions with relation to each other, so as to present successive illuminated portions of the object to successive portions of the light sensitive surface, said member with light sensitive surface and said object having their opposed surfaces maintained at substantially the same distance from each other during the exposure, substantially as described.

3. The method of illuminating an object for exposure to a member bearing a light sensitive surface, which consists in simultaneously moving, during exposure, the object and light sensitive surface with relation to an interposed slotted screen carrying a source of light on the side adjacent the object, so as to present successive illuminated portions of the object to successive portions of the light sensitive surface, said member with light sensitive surface and said object having their opposed surfaces maintained at substantially the same distance from each other during the exposure, substantially as described.

4. The method of illuminating an object for exposure to a member bearing a light sensitive surface, which consists in continuously and simultaneously moving, during exposure, the object and light sensitive surface with relation to an interposed slotted screen carrying a source of light on the side adjacent the object, so as to present successive illuminated portions of the object to successive portions of the light sensitive surface, said member with light sensitive surface and said object having their opposed surfaces maintained at substantially the same distance from each other during the exposure, substantially as described.

5. The method of illuminating an object for exposure to a member bearing a light sensitive surface, which consists in moving with relation to each other during exposure, the object, the light sensitive surface and an interposed source of light, so as to present successive illuminated portions of the object to successive portions of the light sensitive surface, said member with light sensitive surface and said object having their opposed surfaces maintained at substantially the same distance from each other during the exposure, substantially as described.

In testimony whereof I have affixed my signature, in presence of two witnesses.

ÉDUARD MERTENS.

Witnesses:
HENRY HASPER,
WOLDEMAR HAUPT.